United States Patent [19]

Collier

[11] Patent Number: 4,651,675

[45] Date of Patent: Mar. 24, 1987

[54] MULTIPLE COMPARTMENT STRUCTURE

[75] Inventor: David L. Collier, Portland, Oreg.

[73] Assignee: Collier Products, Inc., Portland, Oreg.

[21] Appl. No.: 698,031

[22] Filed: Feb. 4, 1985

[51] Int. Cl.$^4$ ............................................. A01K 29/00
[52] U.S. Cl. ........................................ 119/1; 119/15; 446/112
[58] Field of Search ................... 119/1, 15, 15.5 R, 17, 119/29; 272/19; 446/111, 112; 211/187, 126; 248/222.2

[56] References Cited

U.S. PATENT DOCUMENTS

| | | | |
|---|---|---|---|
| 1,281,856 | 10/1918 | Shaw | 446/112 |
| 3,260,236 | 7/1966 | Jones | 119/1 |
| 3,482,709 | 12/1969 | Larson | 211/187 |
| 3,554,382 | 1/1971 | Griubergs | 446/112 |
| 3,827,177 | 8/1974 | Wengel | 446/116 |
| 3,857,364 | 12/1974 | Miller | 119/1 |

FOREIGN PATENT DOCUMENTS 182663 12/1954 Fed. Rep. of Germany ........ 272/19

Primary Examiner—Gene Mancene
Assistant Examiner—John G. Weiss
Attorney, Agent, or Firm—Olson and Olson

[57] ABSTRACT

A small animal exercise maze comprises a multiple compartment structure formed of a pluralty of wall panels secured removably at their inner ends to a support base and joined together at their outer ends by clips which secure together the outer ends of adjacent wall panels. Passageway openings are provided through selected common walls of adjacent compartments to form a maze path for an animal to move to and from a specialized compartment provided by omitting selected interior wall within the unit. An animal exercise wheel is mounted within the specialized compartment and the latter is closed by an approriately dimensioned closure wall.

9 Claims, 7 Drawing Figures

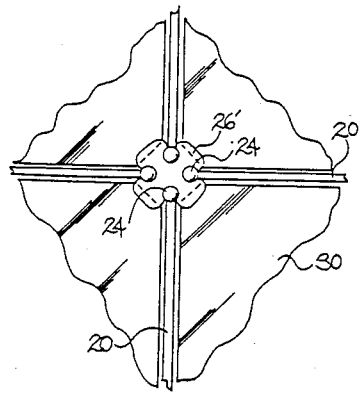
Fig. 4
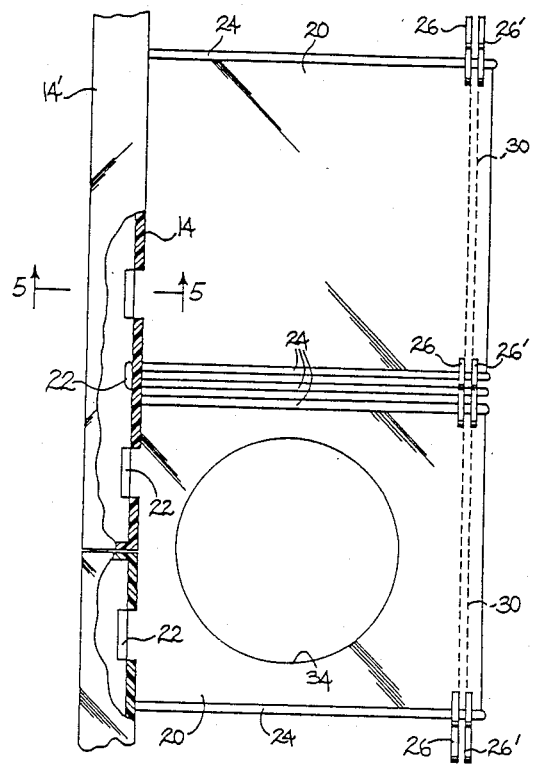
Fig. 3
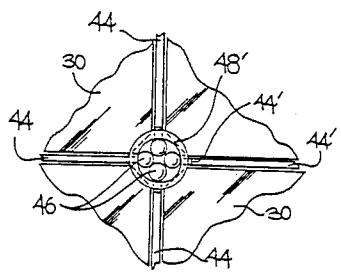
Fig. 5
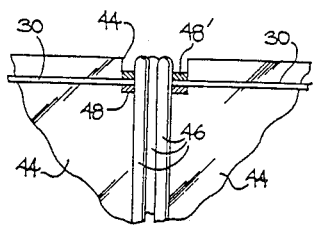
Fig. 6
Fig. 7

MULTIPLE COMPARTMENT STRUCTURE

BACKGROUND OF THE INVENTION

This invention relates generally to multiple compartment display cases, and more particularly to cages and mazes for small research and pet animals such as hamsters, gerbils, mice and the like.

Small animal cages and mazes are known in the art and are exemplified by those disclosed in U.S. Pat. Nos. 3,516,389; 3,750,625; 3,857,364; 3,924,571; and 4,301,766. These are characterized by complex and costly structures of limited size many of which are incapable of being expanded beyond such limits and others of which are incapable of being disposed in a vertical orientation for display.

SUMMARY OF THE INVENTION

In its basic concept, this invention provides a multiple compartment structure formed of a multiplicity of wall panels secured removably to one or more base members and joined together at common edges by clips which may also serve to removably secure front walls for the compartments.

It is by virtue of the foregoing basic concept that the principal objective of this invention is achieved; namely, to overcome the aforementioned disadvantages and limitations of prior multiple compartment structures.

Another object of this invention is the provision of a multiple compartment structure of the class described in which the wall elements serve to interconnect a plurality of base members for expanding the system.

Still another object of this invention is to provide a multiple compartment structure of the class described which may be arranged in the form of a small animal maze the pattern of which may be varied with speed and facility.

A further object of this invention is to provide a multiple compartment structure of the class described in the form of a small animal maze wherein means is provided by which a single compartment may be modified to form a pair of maze passageways.

A still further object of this invention is the provision of a multiple compartment structure of the class described in the form of a small animal maze wherein means is provided for integrating an exercise wheel.

Another object of this invention is to provide a multiple compartment structure of the class described which is of simplified construction for economical manufacture, easy of assembly and disassembly and compact collection of the parts for minimum storage space.

The foregoing and other objects and advantages of this invention will appear from the following detailed description, taken in connection with the accompanying drawings of preferred embodiments.

BRIEF DESCRIPTION OF THE DRAWINGS

FIG. 3 is a fragmentary end view of two adjacent compartments of FIG. 1 joined together in the system and showing one compartment wall functioning to interconnect a pair of base plates.

FIG. 4 is a fragmentary plan view of one compartment wall connector joining together two side walls and a front wall.

FIG. 5 is a fragmentary sectional view taken along the line 5—5 in FIG. 3 showing the base support plate removably mounting a wall section.

FIG. 6 is a fragmentary plan view, similar to FIG. 4, of another embodiment of a wall connector joining together the common side and front walls of four adjacent compartments.

FIG. 7 is a fragmentary side elevation of the connector of FIG. 6 as viewed from the bottom in FIG. 6.

DESCRIPTION OF THE PREFERRED EMBODIMENTS

Figure 1:
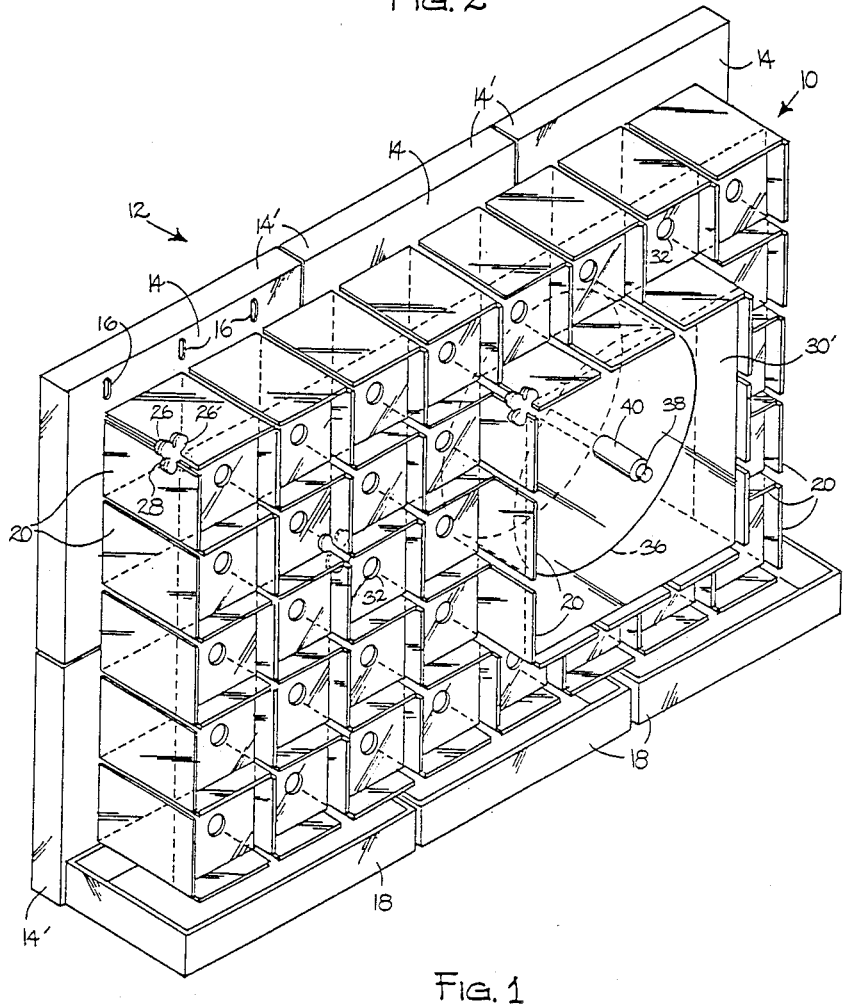
FIG. 1 is a perspective view of a small animal display cage embodying the features of this invention.

As shown in FIG. 1, the display cage illustration of this invention comprises a multiple compartment unit, illustrated generally as rectangular system 10 mounted on support base 12. The illustrated support base comprises a plurality of square plates 14 which may, if desired, be mounted on a common vertical surface such as a wall, or it may be supported upon a table or other horizontal surface. The base 12 may alternatively be provided as one plate, as desired. Each base plate 14 includes a peripheral wall 14' and is provided with a plurality of openings 16 therethrough arranged in predetermined positions for mounting compartment wall panels, as described in detail hereinafter.

Drip trays 18 may be provided beneath the system 10 to catch debris resulting from a living animal. These drip trays also may serve to support the assembly of multiple compartment unit 10 and base 12 in a vertical disposition freely upon a table or horizontal support.

The system 10 shown in FIG. 1 is formed of a plurality of individual wall panels 20 attached to the base 12. As best seen in FIGS. 1 and 3, the wall panels are configured as rectangular plates, preferably of transparent plastic material, with a pair of L-shaped mounting flanges 22 formed on their inner edges. The flanges are arranged to enter the openings 16 when the wall panel 20 is placed substantially parallel to the plate 14 and then rotated outward to a position perpendicular to the plate (FIG. 5). The flanges thus securely lock the wall panel to the base plate. All wall panels forming the compartments illustrated in the drawing are mounted to the base plate in the same manner.

As is apparent from FIGS. 1 and 3, one means by which individual plates 14 may be joined together is by bridging them with common wall panels. As shown in FIG. 3, one flange 22 associated with a wall panel 20 is received by an opening 16 in one plate 14, and the other flange associated with that same wall panel is received by an opening 16 in the adjacent plate 14, thereby securing the two plates together.

Means is provided for connecting adjacent wall panels 20 to each other for strength and security for the system. In the embodiment illustrated in FIGS. 3 and 4, the side edges 24 of the wall panels are enlarged and cooperate with coupler means for securely joining together the enlarged edges of adjacent wall panels. The coupler 26, preferably made as a plate of resilient synthetic resin and configured similar to a four leaf clover, includes four key-hole type openings 28 which are slightly enlarged at their inner, closed ends and spaced apart 90° from each other. When pressed firmly into the opening 28, the enlarged edge 24 of a wall panel is securely captured in the enlarged portion of the opening 28. The inherent resiliency of the coupler firmly engages the wall panel and joins it to another wall panel captured in another opening 28 of the same coupler.

From the foregoing, it is seen that construction of the display unit entails mounting of a plurality of wall panels 20 to the base plates 14 and then connecting adjacent walls together with couplers 26. The couplers 26, having four joining openings 28, can receive wall panels at 90° intervals. Thus, inside and outside compartment wall panels may be joined together to form a system such as is shown in FIG. 1. Most of the couplers required to join all wall panels together have been depleted in FIG. 1, merely for simplicity and clarity of the drawing.

Closure of the compartments, for example so that an animal cannot escape, requires a front closure wall, preferably of transparent material. In the embodiment illustrated, each individual compartment is provided an individual front wall 30 which is configured to be disposed within the four walls of each compartment. After the compartment is formed and secured together by couplers 26, the front wall 30 is laid in against the front surface of the coupler portion which extends into the compartment between adjacent openings 28 (FIGS. 3 and 4). A second coupler 26' then is pressed onto the wall edges 24 over the front wall 30, thereby capturing the front wall securely between the couplers 26 and 26'.

Air ports 32 may be provided through the front walls in order to permit passage of adequate breathing air for the animal and to permit hand feeding, when desired.

With the construction of the system thus basically described, it is apparent that the system comprises a plurality of separate, adjacent compartments sharing common walls, all together forming the basic multiple compartment unit. For purposes of an animal maze, passageway means need be provided between adjacent compartments in order that an animal may move throughout the maze system. Such access is provided by means of openings 34 through the common walls of adjacent compartments that are selected for use by the animal.

Figure 2:
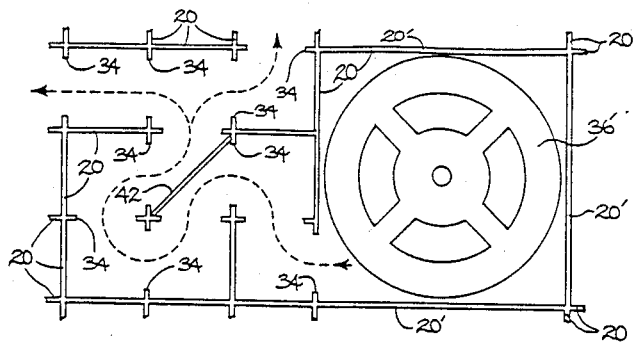
FIG. 2 is a fragmentary schematic view of a plurality of individual compartments in the system of FIG. 1, the broken lines indicating animal travel through one configuration of a maze wherein a diagonal wall in one of the compartments converts the compartment into two passageways of the maze.

Thus, certain common internal wall panels 20 are provided with openings 34 therethrough to permit movement of an animal between compartments, as best illustrated in FIG. 2. The openings may be arranged in a maze like fashion throughout the system, or may be randomly arranged, as desired.

Internal passageway wall panels may have a variety of constructions. However, preferred constructions are either premanufactured, interchangeable solid and open internal wall panels which the owner would choose between in designing the system. Alternatively, wall panels may be provided which incorporate a "punchout" section, whereby the owner may leave a panel solid or open it by removing the "punch-out" section. Plugs also may be provided in order to close openings so that the maze pattern may be changed periodically with speed and facility.

The display unit may include certain compartments which are arranged to be larger or configured differently than other compartments in the system, simply by omitting selected internal wall panels and providing appropriately sized wall panels (FIG. 1), or by adding divider panels to other selected compartments (FIG. 2). In the first case, an exercise wheel compartment may be provided, as shown in FIG. 1, by omitting certain wall panels within a selected area and providing a larger, single front panel 30'.

The specialized compartment illustrated houses a typical hamster exercise wheel 36, the hubs 36' of which are supported on an axle 38 journaled in bearings on the front wall 30' and the back supporting base 12. Spacer 40 on axle 38 centers the wheel 36 between the wall 30' and base 12. The peripheral wall panels 20' are taller than the wall panels 20 of the maze to increase the depth of the compartment to allow the animal to move around the wheel to gain access to the maze or to the wheel for exercising.

In the other example mentioned above, certain compartments of the maze may be provided with dividers, such as the diagonal wall 42 shown in FIG. 2. Installation of such a divider wall is extremely simple, in that since it is proportioned to fit diagonally across a compartment, no fastener is required to hold it in position. It's depth is less than that of the wall panels 20, so that when arranged diagonally in a compartment it is captured therein between the base plate 14 and front panel 30. Thus, use of dividers 42 significantly increases the variety of maze paths available to the system. Obviously, where a diagonal wall is used in an interior compartment, such as in FIG. 2, that compartment will be provided with passageway openings through each of its four side wall panels.

Referring now to FIGS. 6 and 7, these show another embodiment of coupling means arranged to join wall panels together. In this embodiment, each wall panel 44 includes a notched portion 44' at its outer end spaced slightly inward of its inner edge 46. A removable connector ring 48 is pressed into the notched portion, encircling and capturing the upper inner edges 46 of the wall panels to be joined together. A front panel 30 is disposed over the ring 48 and a second ring 48' is fitted thereover, capturing the front panel between the rings 48 and 48' in the same manner as described in connection with the couplers 26 and 26'.

The concept introduced by the present invention lends itself to a wide variety of contemplated modifications and possible uses other than those already described. For example, the unit may be arranged to display art objects or other products. The front panels may be omitted, if desired. Although each compartment is illustrated herein as including a separate front panel, it may be advantageous to provide a single panel covering the entire front side of the unit. This may be desired in order to facilitate cleaning and access to a pet. Also, it may be desired that certain interior wall panels be constructed of mesh material in order that animal discards and the like can fall freely through the system to the trays 18 for expedient removal. Feeding, sleeping, access and other specialized compartments may be provided by the owner simply by accommodating such desires during the assembly of the system. Also, as an alternative to the specific arrangement of FIG. 1, the entire unit may utilize the longer wall panels 20' associated with the specialized compartment housing the exercise wheel so that the front wall remains uniform.

From the foregoing it will be apparent to those skilled in the art that various changes, other than those already described, may be made in the size, shape, type, number and arrangement of parts described hereinbefore without departing from the spirit of this invention and the scope of the appended claims.

Having thus described my invention and the manner in which it may be used, I claim:

1. A multiple compartment structure, comprising:
   (a) a support base having a plurality of openings therein arranged to define locations of compartment walls,
   (b) a plurality of compartment wall panels having tabs on the inner ends thereof configured to enter the openings in the base for releasably securing the panels to the base with the side edges of adjacent panels disposed closely adjacent to each other,
   (c) first clip means releasably joining together the outer ends of the adjacent edges of adjacent panels to secure the outer ends of the wall panels together in compartment-forming arrangement,
   (d) a front wall for at least some of the compartments, the front wall resting on the first clip means at the corners of the associated compartment, and
   (e) second clip means overlying the front wall and confining the latter between the first and second clip means.

2. The multiple compartment structure of claim 1 wherein the side edges of the wall panels are enlarged, and each clip means comprises a flat plate provided with peripherally spaced apart key-hole type slots each configured to receive therein the enlarged edge and adjacent portion of a wall panel.

3. The multiple compartment of claim 2 wherein the flat plate is provided with four key-hole slots spaced apart 90° for securing adjacent wall panels of four compartments.

4. The multiple compartment structure of claim 2 wherein the flat plate is provided with said key-hole slots spaced apart 90° for securing adjacent wall panels of a compartment, the flat plate between the slots forming a support for the front wall.

5. The multiple compartment structure of claim 1 wherein each wall panel is provided with a notch at its outer end inwardly of the side edge, and each clip means comprises an annular ring configured for reception in the notches of adjacent wall panels.

6. The multiple compartment unit of claim 5 wherein the annular ring between adjacent notches forms a support for the front wall.

7. The multiple compartment structure of claim 1 wherein the base includes a plurality of base plates each having a plurality of said openings therein, and at least some of wall panels are provided with a pair of tabs on their inner ends configured to engage in openings of adjacent base plates, whereby the wall panel functions to join adjacent base plates together.

8. The multiple compartment structure of claim 1 wherein some of the wall panels under the front walls are provided with openings therethrough arranged to form a small animal maze.

9. The multiple compartment structure of claim 8 including a divider wall panel configured to extend between diagonal corners of a compartment under a front wall, the four wall panels of said compartment having maze-forming openings therethrough, the divider wall panel terminating at the upper end thereof under the front wall.

* * * * *